United States Patent [19]
Koning

[11] Patent Number: 5,424,861
[45] Date of Patent: Jun. 13, 1995

[54] OPTICAL SIGNAL TRANSMISSION WITH POLARIZATION-INSENSITIVE COHERENT DETECTION AND FREQUENCY STABILIZATION AT THE RECEIVING END

[75] Inventor: Oscar J. Koning, Amsterdam, Netherlands

[73] Assignee: Kloninklijke PTT Nederland N.V., Groningen, Netherlands

[21] Appl. No.: 47,573

[22] Filed: Apr. 14, 1993

[30] Foreign Application Priority Data

Apr. 23, 1992 [NL] Netherlands ............... 9200748

[51] Int. Cl.$^6$ .................................. H04B 10/00
[52] U.S. Cl. ......................... 359/156; 359/182; 359/194; 359/173
[58] Field of Search ............. 359/156, 189–192, 359/194–195, 122, 173, 182, 188

[56] References Cited

U.S. PATENT DOCUMENTS

| | | | |
|---|---|---|---|
| 4,783,852 | 11/1988 | Auracher | 359/194 |
| 4,965,857 | 10/1990 | Auracher et al. | 359/156 |
| 5,008,958 | 4/1991 | Cimini | 359/192 |
| 5,124,828 | 6/1992 | Mahon | 359/192 |
| 5,134,509 | 7/1992 | Olshansky et al. | 359/192 |
| 5,189,544 | 2/1993 | Sailer | 359/113 |

FOREIGN PATENT DOCUMENTS

| | | |
|---|---|---|
| 0361150A3 | 4/1990 | European Pat. Off. . |
| 0474914A1 | 3/1992 | European Pat. Off. . |
| 8910031 | 10/1989 | WIPO ............... 359/182 |

OTHER PUBLICATIONS

Electronics Letters, vol. 23, No. 10, May 7, 1987, Stevenage GB, pp. 513–514, Hodgkinson et al., "Polarisation Insensitive Heterodyne Detection Using Polarisation Scrambling".
R. Noé et al., "Polarisation–Insensitive 500 M/bits FSK Transmission over 153 km by Passive Polarisation Switching", Jan. 5, 1989, pp. 4–5, Electronics Letters, vol. 25, No. 1.
B. Christensen, et al., "Multivariable State Feedback AFC for a 2.5 Gbit/s CPFSK Coherent Optical Communication System", 1990, pp. 339–342, ECOC.
T. G. Hodkinson et al., "Polarisation–Insensitive Heterodyne Detection Using Polarisation Scrambling", May 1987, pp. 513–514, Electronics Letters, vol. 23, No. 10.
G. R. Walker et al., "Rugged All–Fibre Endless Polarisation–Controller", Oct. 27, 1988, pp. 1353–1354, Electronics Letters, vol. 24, No. 22.

*Primary Examiner*—David K. Moore
*Assistant Examiner*—Kinfe-Michael Negash
*Attorney, Agent, or Firm*—Frishauf, Holtz, Goodman & Woodward

[57] ABSTRACT

An optical communication system comprises a transmitter (1), a receiver (3) and optical transmission path (2) between the transmitter and receiver. The transmitter (1) includes an electro-optical transducer (4) for converting a data input signal which is binary-coded according to a given bit period, into a polarized FSK-modulated optical signal, and a polarization switching device (5) for modifying the polarized FSK-modulated optical signal into a data-induced polarization switched signal (DIPS-signal), which is transmitted over the transmission path (2) to said receiver (3). The receiver (3) includes a local oscillator (8; 31) for generating a local optical signal; a mixer (9; 32) for mixing the received optical signal and the local optical signal to produce a mixed optical signal; and a detector (10; 33) for detecting and converting the mixed optical signal into a corresponding electrical signal. A device is provided at the receiver for deriving, from the electrical signal, a data signal in accordance with the binary data pattern, and a frequency control signal for controlling the local oscillator (8). A polarization variation device (6) is included in one of (a) the optical transmission path between the polarization switching device of the transmitter and the mixer of the receiver for periodically varying the polarization of the DIPS-signal, and (b) the receiver for periodically varying the polarization of the local optical signal before mixing of the received optical signal and the local optical signal by the mixer. The polarization variation device varies the polarization of the optical signal with a variation period longer than the bit period and shorter than a control time period needed for controlling the local oscillator.

11 Claims, 3 Drawing Sheets

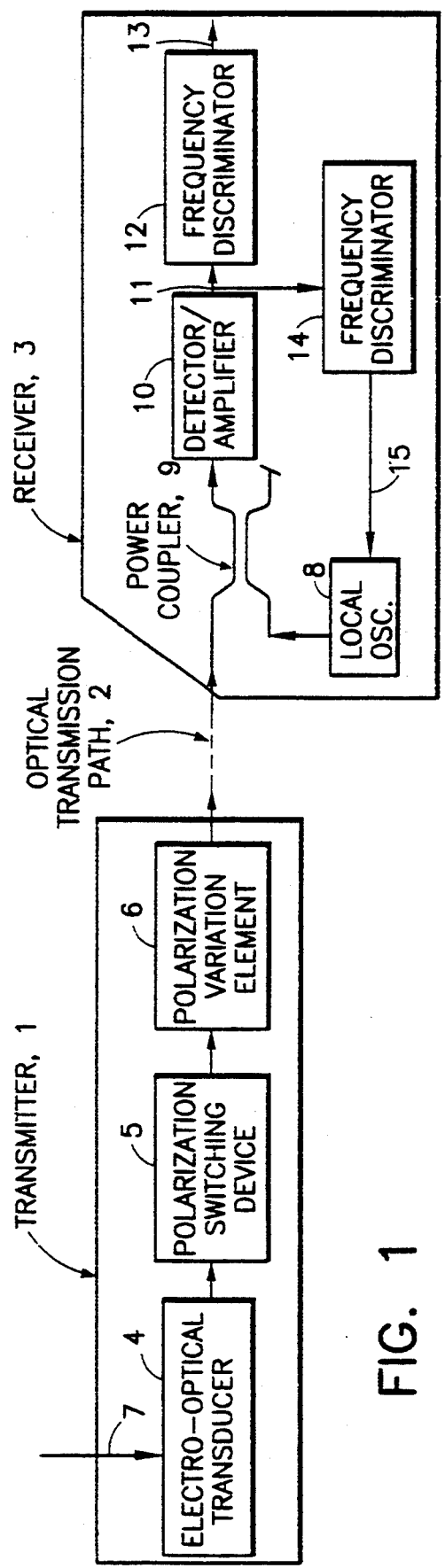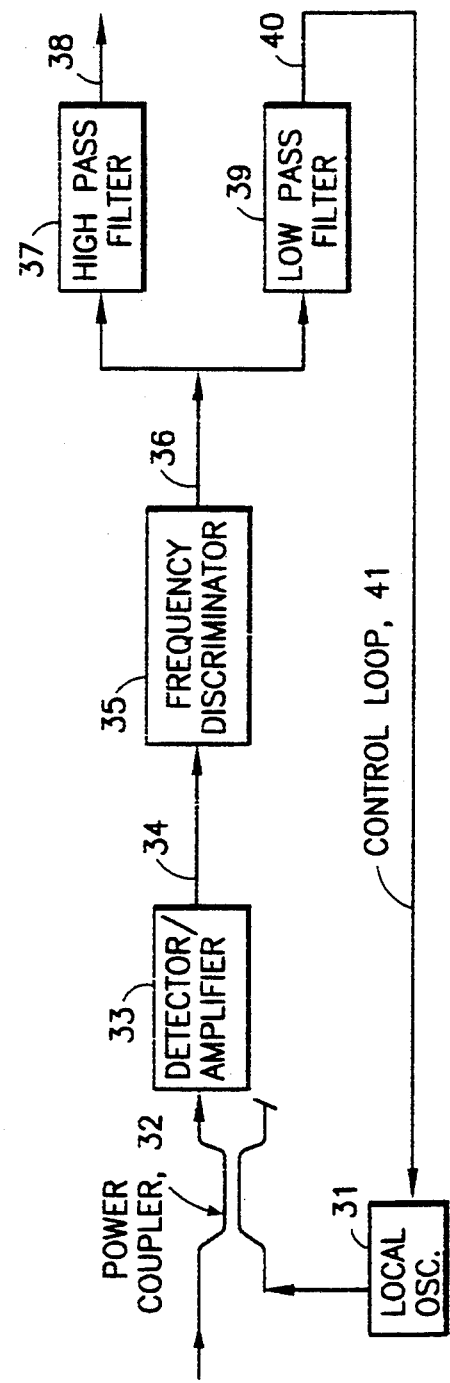

OPTICAL SIGNAL TRANSMISSION WITH POLARIZATION-INSENSITIVE COHERENT DETECTION AND FREQUENCY STABILIZATION AT THE RECEIVING END

A. BACKGROUND OF THE INVENTION

1. Field of the Invention

The invention is in the field of optical signal transmission and techniques for polarization-insensitive coherent signal detection. More particularly, the invention relates to an improvement in a system and a method of optical signal transmission with polarization-insensitive coherent detection and frequency stabilization at the receiving end.

2. Prior art

A method of achieving reliable coherent signal reception is to use a polarization-insensitive detection. One of the standard techniques used for this purpose is the one in which so-called 'data-induced polarization switching' (DIPS) is employed. Such a technique is disclosed, for example, in reference [1]. In this technique, the "zeros" and the "ones" of binary-coded data are transmitted as optical signals having different, mutually orthogonal polarization. This achieves the result that, in a coherent receiver, a signal, at least either only the "zeros" or only the "ones", but generally both, is detected for any polarization setting whatsoever. Such a method of polarization switching can be achieved, as is also disclosed in reference [1] by causing a signal which is FSK-modulated in accordance with the binary-coded data to propagate through a birefringent fiber. In this situation, the length of the fiber is determined by the frequency swing used in the modulation. In coherent transmission systems in which, to achieve a polarization-insensitive signal transmission, DIPS is applied to FSK-modulated signals, the received light signal is coupled at the receiving end to a light signal originating from a local oscillator and picked up by a detector. Two operations are performed on the detected electrical signal downstream of the detector. The first operation relates to a demodulation in which the original data is recovered from the electrical signal. In the second operation; a control signal which is fed back via a frequency control loop to the local oscillator for the purpose of automatic frequency control (AFC) is derived from the electrical signal. Said control signal is proportional to the difference between a desired set frequency, the so-called intermediate frequency (IF) and a frequency interval (IF'), derived from the electrical signal, between the signal frequencies of the local oscillator and the received signal. In an AFC control as disclosed, for example, in references [2] and [3], a frequency discriminator is used to derive the control signal. Such a discriminator has a transfer function having a number of passages through zero which are chosen in such a way that they can coincide with the frequency signal peaks of the logic values "zero" and "one", such as those which may occur in the received FSK-modulated signal. As a result, even if the 'ones' or the 'zeros' are missing, the discriminator is able to generate an electrical signal which is proportional to the frequency interval IF'. As a result of the operation, a control voltage is obtained with which the local oscillator can be adjusted in such a way that a frequency deviation between IF' and IF is corrected both for magnitude and for sign. Such an AFC control achieves a stable frequency tuning since the control continues to operate even if one of the frequency signal peaks, either that of the "ones" or that of the "zeros" were to be missing at any random polarization setting. A drawback is, however, that, if both 'zeros' and 'ones' are not already present in the detected signal during a start-up procedure in which the frequency of the local oscillator is set to the vicinity of the IF and the AFC control loop is then closed, such a stable frequency tuning cannot be brought about. If only one frequency signal peak is detected during start-up, it is not possible, after all, to discern on what side thereof the IF is.

B. SUMMARY OF THE INVENTION

The object of the invention is to eliminate the above-mentioned drawback. It is achieved by a measure which improves an optical communication system of a type such as the one cited above in reference [2] in the sense that, for any polarization state of the local oscillator or of the received signal whatsoever, mainly signals having the same polarization are prevented from being detected within the characteristic control time of the control loop in the AFC control. A system for optical signal transmission comprising first generation means for generating a first optical signal, which first optical signal is FSK-modulated and polarization-switched in accordance with a binary data pattern having a given bit period, second generation means, called the local oscillator means, for generating a second optical signal, mixing means for mixing the first and the second optical signal, detection means for detecting the mixed optical signal and converting it into a corresponding electrical signal, deriving means for deriving, from the electrical signal a frequency control signal for controlling the local oscillator means and a data signal in accordance with said binary data pattern, is, according to the invention, characterized by providing moreover polarization variation means for periodically varying the polarization of one of the optical signals with a variation period longer than the bit period and shorter than the control time needed to control the local oscillator means.

A method of polarization-insensitive transmission and coherent detection of an optical signal comprising the generation of a first optical signal, which first signal is FSK-modulated and polarization-switched in accordance with a binary data pattern having a given bit period, the generation of a second optical signal (the local oscillator signal), the mixing of the first and the second optical signal, the detection of the mixed signal and conversion into a corresponding electrical signal, the deriving, from the electrical signal, of a frequency control signal for controlling the frequency of the local oscillator signal and a data signal corresponding to said binary data pattern, is, according to the invention characterized in that the method comprises, moreover, periodically varying the polarization of one of the optical signals with a variation period which is longer than the bit period and shorter than the control time needed to control the frequency of the local oscillator signal. Such a system and such a method for polarization-insensitive signal transmission and coherent detection achieve the result that, regardless of the polarization setting of the local oscillator or the polarization state of the received signal, both frequency signal peaks are always present in the detected electrical signal.

In an optical communication system in which more than one receiver must be able to tune to the same transmitter, as is the case in a distributive system, the polarization variation preferably takes place at the transmitting end, the polarization variation means being incorporated between the first generation means and the mixing means in the vicinity of said generation means. Preferably those means are used as polarization variation means which form a component of a polarization controller as disclosed in reference [4] or [5]. In a preferred embodiment, the means for periodically varying the polarization comprise a first portion of birefringent fiber of suitably chosen length wound around a cylinder of piezoelectric material and voltage control means for periodically varying the voltage across the piezoelectric material in accordance with the variation period.

Such polarization variation means based on periodic stretching of a birefringent fiber can be suitably combined with the means with which the polarization switching is achieved in the first generation means. In a further preferred embodiment, a second portion, of birefringent fiber is provided for having a length which is greater than that of the first portion, which second portion forms part of the means for generating the first light signal for the purpose of bringing about the polarization switching of the first optical signal, and of which second portion a part having the said suitably chosen length forms the first portion, which is wound around said cylinder.

If, moreover, an additional requirement is imposed on the binary code of the data signal to be transmitted at the transmitting end, the coherent receiver can still be simplified to some extent. In yet another preferred embodiment, the deriving means comprise a frequency discriminator for deriving the electrical signal from a discriminator signal which includes in the high frequency range the data signal and in the low frequency range the frequency control signal, the binary data pattern having a coding which has an equal distribution of the code elements.

Further the invention relates to a transmitter and a receiver for a system for optical signal transmission.

C. References

[1] U.S. Pat. No. 5,008,958, entitled: Polarization-insensitive technique for coherent optical communication;

[2] R. Noé, et al. "Polarisation-insensitive, 500 Mbit/s FSK transmission over 153 km by passive polarization switching", Electronics Letters, 5th January 1989, Vol. 25, No. 1, pp. 4,5;

[3] B. Christensen, et al.: "Multivariable state feedback AFC for 2.5 GBit/s CPFSK coherent optical communication system", ECOC '90, pp. 339–342;

[4] G. R. Walker, N. G. Walker: "Practical high-speed endless polarization controller", ECOC '89, WeP-6, pp. 535–538;

[5] G. R. Walker, N. G. Walker, Electronics Letters, Vol. 24, No. 22, 1988, pp. 1353,1354.

D. SHORT DESCRIPTION OF THE DRAWINGS

The invention will be explained below by a description of an exemplary embodiment with reference to a drawing, wherein:

FIG. 1 shows a diagrammatic overview of an optical communication system according to the invention;

FIG. 5 shows a diagram of a simplified coherent receiver according to the invention.

E. DESCRIPTION OF AN EXEMPLARY EMBODIMENT

Figure 2A:
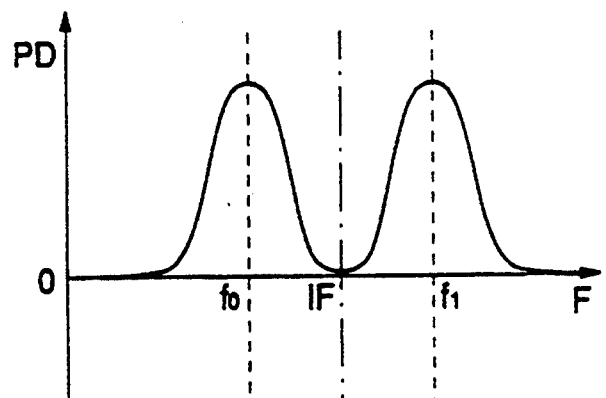
FIG. 2(a) shows a power distribution of a detected intermediate-frequency (IF) signal as a function of the frequency.

The invention relates to a heterodyne coherent optical communication system in which frequency modulation (FSK) is used and in which 'data-induced polarization switching' (DIPS) is also applied to the FSK-modulated optical signal.

FIG. 1 of the drawing diagrammatically shows an optical communication system, known per se, in which, according to the invention, a polarization variation which is slow compared to the bit rate is carried out on the FSK-modulated and polarization-switched optical signal, preferably in the transmission path between a transmitter and a heterodyne coherent receiver. The communication system comprises a transmitter 1 for transmitting optical signals via an optical transmission medium 2 to one or more coherent receivers 3. The transmitter 1 comprises, consecutively, a combined laser/modulator 4, a DIPS element 5 and a polarization variation element 6. The laser/modulator 4 converts a binary-coded data signal presented via an input 7 into a corresponding FSK-modulated optical signal, the binary "zeros" and "ones" of the data signal, respectively, being represented by light pulses having frequencies $f_0$ and $f_1$ with identical polarization. In the DIPS element, the light pulses having the frequencies $f_0$ and $f_1$ acquire different, mutually orthogonal polarizations.

In the polarization variation element 6, also referred to as polarization scrambler, the polarizations of the successive light pulses presented are continually altered with a speed which is slower than the bit rate, but is such that the orthogonality of the polarizations of consecutive light pulses having different frequencies is essentially maintained. The signal, which is thus FSK-modulated and polarization-switched and whose polarization is continually varied, is transmitted via the optical transmission medium 2. A coherent receiver for such a signal at the other end of said medium 2 comprises

- a local oscillator 8 for generating a local oscillator signal,
- a polarization-independent power coupler 9 for coupling the received signal and the local oscillator signal,
- a combined detector/amplifier 10 for detecting the coupled signal and for emitting a corresponding electrical intermediate-frequency IF signal at an output 11, a first frequency discriminator 12, for example of the 'delay-line' type, which is used as demodulator for demodulating the IF signal and which emits the original data signal at an output 13, a second frequency discriminator 14, also of the 'delay-line' type, for deriving, from the IF signal, an AFC control signal that is fed via a control loop 15 to the local oscillator 8 to frequency-control the local oscillator.

Figure 2B:
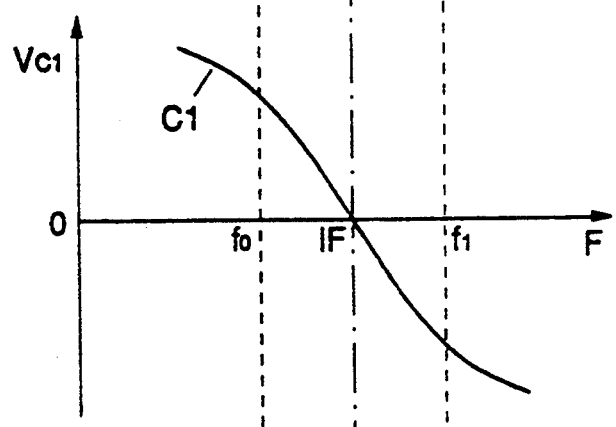
FIG. 2(b) shows a first discriminator curve of a first frequency discriminator used as demodulator.
Figure 2C:
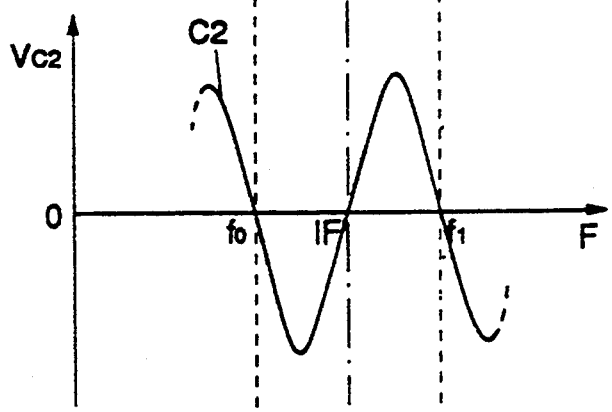
FIG. 2(c) shows a second discriminator curve of a second frequency discriminator for deriving an AFC control signal.

FIG. 2(a) shows a power distribution PD as a function of the frequency F of the IF signal such as that which may be present on the output 11 of the combined detector/amplifier 10. Said distribution has two peaks, respectively at the frequencies $f_0$ and $f_1$. If there is a good coherent mixing of the optical signals in the detector, said distribution will, as shown, have two distinct peaks on either side of the intermediate frequency IF. The IF signal is demodulated in the first frequency discriminator 12. This is done, as indicated in FIG. 2(b), by converting the power distribution of each $f_0$ and $f_1$ pulse in the sequence of detection in accordance with a first discriminator curve C1 having a passage through zero into an output voltage $V_{C1}$ at the output 13 of the frequency discriminator 12. If the passage through zero is correctly set to the intermediate frequency IF, the output voltage on the output 13 fluctuates in accordance with the original binary-coded data signal. In the second frequency discriminator 14, an error voltage signal which is used as AFC control signal is derived from the IF signal. This is done, as indicated in FIG. 2(c), with the aid of a second discriminator curve C2 having a number of passages through zero which are chosen in such a way that they are able to coincide with the peaks at the frequencies $f_0$ and $f_1$ in the power distribution. In this process, the power distribution is converted into an output voltage $V_{C2}$ whose mean forms the error voltage signal. With a correct tuning to the intermediate frequency IF, the mean is zero; with a tuning to the left of the desired IF, the mean is negative, and with a tuning to the right thereof it is positive.

If no polarization variation is used, as in a system in accordance with the prior art, either only the 'ones' or only the 'zeros' or both in an arbitrary ratio may be detected, for example as a consequence of drift in the polarization setting of the local oscillator signal or in the received signal, with an unbalanced power distribution as a result. The AFC control described functions correctly even under such conditions. If, however, when a reception link is being established from the respective coherent receiver 3 to the transmitter 1, an unbalanced power distribution is already detected which is such that it exhibits only one peak, a correct tuning to the desired IF cannot be brought about. After all, it is now not possible to discern on which side of the one detected peak the desired intermediate frequency is situated. This problem can be avoided by ensuring that the polarization of one of the two optical signals coupled in the coupler 9 is varied periodically in such a way that all the possible polarization states are traversed within the control time of the AFC control. The polarization variation must not, however, take place so fast that the polarization switching is disturbed thereby. The period of the polarization variation must therefore, in addition, be greater (for example, one or several orders of magnitude) than the bit period of the binary data to be transmitted. In a distributive optical communication system in which a plurality of receivers have to be able to tune to one transmitter, the polarization variation is preferably carried out at the transmitting end on the FSK-modulated optical signal.

Figure 3:
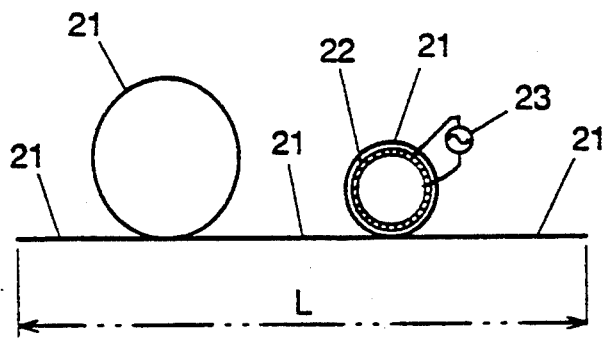
FIG. 3 shows a combination of a DIPS element and a polarization element based on a single birefringent optical fiber.

Various polarization scramblers are known which may serve as polarization variation element 6. Preferably, however, use is made of a scrambler based on a radially expandable piezotube around which a certain length of birefringent fiber is wound. Since the DIPS element 5, as known, can also be constructed using a birefringent fiber of suitably chosen length, the DIPS element 5 and the polarization variation element 6 can readily be combined. This is shown diagrammatically in FIG. 3. A birefringent fiber 21 having a total DIPS length L tuned to the frequency swing is locally wound in a single layer around a cylindrical tube 22 made of piezoelectric material. Connected between the outside and the inside surface of the tube is a voltage source 23 for supplying a periodically varying voltage to produce the piezoelectric effect.

Experimentally, a suitable polarization variation was obtained when use was made of a tube having a diameter of approximately 5 cm, around which 21 m of fiber had been wound, with a periodical voltage variation of approximately 1000 V at 50 Hz. Under these circumstances, 1000 V of piezoelectric voltage corresponds to a differential phase shift between the two polarizations of 16 $\pi$, and this corresponds to a polarization variation period of approximately 2.5 ms, which is less than the usual AFC control times, which are generally in the order of 10 ms.

Figure 4A:
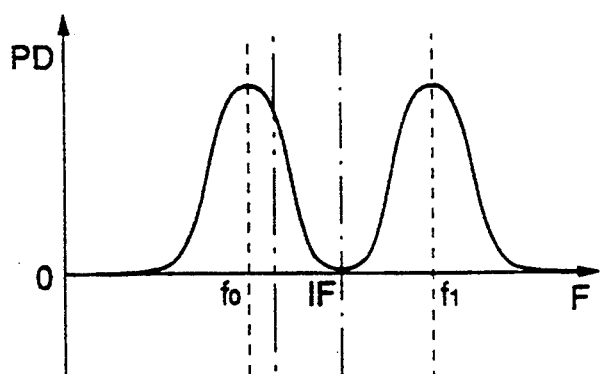
FIG. 4(a) shows a power distribution of a detected intermediate-frequency (IF) signal as a function of the frequency if a line coding of the binary data signal is used.
Figure 4B:
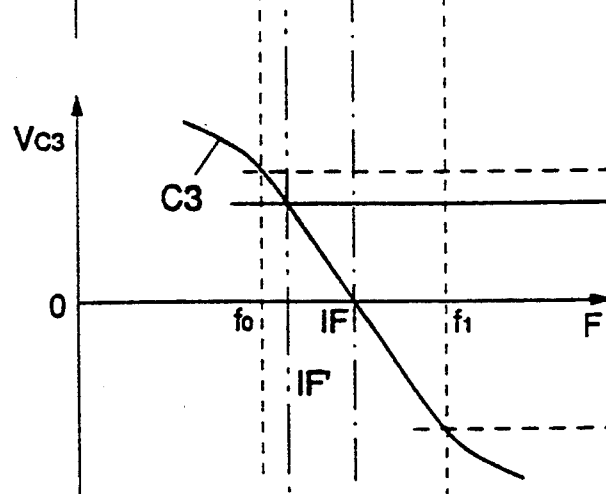
FIG. 4(b) shows a discriminator curve of a frequency discriminator as used for a power distribution according to FIG. 4(a)
Figure 4C:
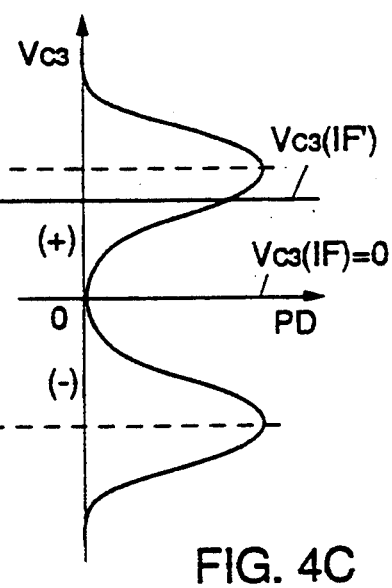
FIG. 4(c) shows the mean of an output voltage of a frequency discriminator having the discriminator curve according to FIG. 4(b) as a function of the power distribution according to FIG. 4(a)

If a polarization variation according to the invention is, in addition, used in combination with a so-called line coding of the data signal to be transmitted, which line coding has an equal distribution of the 'zeros' and 'ones' per unit time, such as, for example, the Manchester code, the power distribution of the IF signal is essentially symmetrical and it has clearly distinguishable peaks. This power distribution PD is shown as a function of the frequency F in FIG. 4(a). With a frequency discriminator based on a discriminator curve C3 as shown in FIG. 4(b), which is of the same type as the curve C1 shown in FIG. 2(b), the IF signal can again be demodulated since the fast voltage fluctuations of an output voltage $V_{C3}$ at the output of the discriminator again correspond to the original binary-coded data signal. FIG. 4(c) shows the mean of the output signal $V_{C3}$, which in fact forms the slow fluctuations thereof, as a function of the power distribution PD. Since this power distribution is essentially symmetrical, it can be read off the figure that, with a correct setting to the intermediate frequency IF, said mean has the value zero ($V_{C3}(IF)=0$), but that a deviation to the left or to the right side thereof, for example with a setting IF' as shown to the left side of the intermediate frequency IF, results in a positive (+) and a negative (−) voltage value ($V_{C3}(IF')$), respectively. This mean voltage value can therefore be used as an AFC control signal. The number of frequency discriminators required in the coherent receiver 3 of FIG. 1 can consequently be reduced to only one. Such a receiver is shown diagrammatically in FIG. 5. This coherent receiver comprises a local oscillator 31 for generating a local oscillator signal, a polarization-independent power coupler 32 for coupling the received signal and the local oscillator signal, a combined detector/amplifier 33 for detecting the coupled signal and emitting a corresponding electrical intermediate-frequency IF signal at an output 34, a frequency discriminator 35 of the 'delay-line' type having an output 36, a high-pass filter 37 having an output 38 for emitting the demodulated original data signal, and a low-pass filter 39 having an output 40 for emitting an AFC control signal which is fed by a control loop 41 to the local oscillator 31 to frequency-control the local oscillator.

I claim:

1. An optical communication system comprising a transmitter (1) for transmitting an optical signal and a receiver (3) for receiving an optical signal transmitted via an optical transmission path (2) between said transmitter and said receiver, (a) said transmitter (1) comprising:

an electro-optical transducer (4) for converting a data input signal which is binary-coded according to a given bit period, into a polarized FSK-modulated optical signal; and polarization switching means (5) for modifying the polarized FSK-modulated optical signal into a data-induced polarization switched signal (DIPS-signal), which DIPS-signal is transmitted over said transmission path (2) to said receiver (3); and (b) said receiver (3) comprising:

a local oscillator (8; 31) for generating a local optical signal;

a mixer (9; 32) for mixing the optical signal received via said transmission path and the local optical signal to produce a mixed optical signal;

a detector (10; 33) for detecting and converting the mixed optical signal into a corresponding electrical signal;

deriving means (12, 14-; 35, 37, 37) for deriving, from the electrical signal, a data signal in accordance with a binary data pattern, and a frequency control signal for controlling said local oscillator (8); and wherein:

the optical communication system further comprises polarization variation means (6), included in one of (a) said optical transmission path (2) between said polarization switching means (5) of said transmitter (1) and said mixer (9) of said receiver (3) for periodically varying the polarization of the DIPS-signal, and (b) said receiver (3) for periodically varying the polarization of the local optical signal before mixing of the received optical signal and the local optical signal by the mixer (9; 32), and said polarization variation means (6) varies the polarization with a variation period longer than the bit period and shorter than a control time period needed for controlling said local oscillator (8; 31).

2. The system according to claim 1, wherein said polarization variation means (6) is included in said transmitter (1) between said polarization switching means (5) and said optical transmission path (2).

3. The system according to claim 2, wherein said polarization variation means (6) includes:

a portion of birefringent fibre (21) of a given length wound around a cylinder (22) of piezoelectric material; and voltage control means (23) for periodically varying a voltage across the piezoelectric material in accordance with the variation period.

4. The system according to claim 2, wherein said polarization switching means (5) and said polarization variation means (6) together comprise:

a portion of birefringent fibre having a predefined length (L) for modifying the polarized FSK-modulated signal into the DIPS-signal, which portion is wound around a cylinder (22) of piezoelectric material; and voltage control means (23) for periodically varying a voltage across the piezoelectric material in accordance with the variation period.

5. The system according to claim 1, wherein:

the binary data pattern includes a coding which has an equal distribution of code elements; and said deriving means includes:

a frequency discriminator (35) producing on an output (36) a discriminator signal having in a high frequency range the data signal and in a low frequency range the frequency control signal, and a high pass filter (37) and a low pass filter (39) coupled to the output (36) of the frequency discriminator (35).

6. A method of polarization-insensitive transmission and coherent detection of an optical signal, the method comprising the steps of:

generating a polarized optical signal, which is FSK-modulated in accordance with a binary data pattern having a given bit period;

modifying the polarized FSK-modulated optical signal into a data-induced polarization switched signal (DIPS-signal);

transmitting the DIPS-signal over an optical transmission path;

receiving the transmitted DIPS-signal;

generating an optical local oscillator signal;

mixing the received DIPS-signal and the local oscillator signal to produce a mixed signal;

detecting and converting the mixed signal into a corresponding electrical signal;

deriving, from the electrical signal, a data signal corresponding to the binary data pattern, and a frequency control signal for controlling the frequency of the local oscillator signal; and periodically varying the polarization of one of the DIPS-signal and the local oscillator signal with a variation period which is longer than the bit period and shorter than a control time period needed to control the frequency of the local oscillator signal.

7. The method according to claim 6, wherein:

the binary data pattern includes a coding which has an equal distribution of code elements; and the step of deriving from the electrical signal includes:

a first substep of frequency discrimination to produce a discriminator signal that includes in a high frequency range the data signal and in a low frequency range the frequency control signal; and a second substep of filtering the discriminator signal for obtaining the data signal and the frequency control signal from the high and low frequency ranges, respectively.

8. A transmitter for an optical signal transmission system, comprising:

an input (7) for a data input signal which is binary-coded according to a predefined bit period;

an electro-optical transducer (4) for converting the data input signal into a polarized FSK-modulated optical signal;

polarization switching means (5) for modifying the polarized FSK-modulated optical signal into a data-induced polarization switched signal (DIPS-signal);

polarization variation means (6) for periodically varying the polarization of the DIPS-signal, the polarization variation means varying the polarization with a variation period longer than a bit period and shorter than a control time period needed for controlling a local oscillator; and an output for an optical transmission signal which includes the DIPS-signal having the polarization varied by said polarization variation means (6).

9. The transmitter according to claim 8, wherein said polarization variation means (6) includes:

a portion of birefringent fiber (21) of a given length wound around a cylinder (22) of piezoelectric material; and voltage control means (23) for periodically varying a voltage across the piezoelectric material in accordance with the variation period.

10. The transmitter according to claim 9, wherein said polarization switching means (5) and said polarization variation means (6) together comprise:

a portion of birefringent fibre having a predefined length (L) for modifying the polarized FSK-modulated signal into the DIPS-signal, which portion is wound around a cylinder (22) of piezoelectric material; and voltage control means (23) for periodically varying a voltage across the piezoelectric material in accordance with the variation period.

11. A receiver for an optical signal transmission system, comprising:

a signal input for receiving a first optical signal, which signal is FSK-modulated and polarization-switched in accordance with a binary data pattern having a given bit period;

a local oscillator (8; 31) for generating a second optical signal;

a mixer (32) for mixing the first and the second optical signals to produce a mixed optical signal;

a detector (10; 33) for detecting and converting the mixed optical signal into a corresponding electrical signal;

deriving means (12, 14-; 35, 37, 39) for deriving, from the electrical signal, a frequency control signal for controlling the local oscillator (8; 31 ), and a data signal in accordance with a binary data pattern; and an output (38) for the data signal; and wherein said deriving means includes:

a frequency discriminator (35) producing on an output (36) a discriminator signal having in a high frequency range the data signal and in a low frequency range the frequency control signal; and a high pass filter (37) and a low pass filter (39) coupled to the output (36) of the frequency discriminator (35).

* * * * *